United States Patent [19]

Christ et al.

[11] Patent Number: 5,327,836
[45] Date of Patent: Jul. 12, 1994

[54] RETURNING SYSTEM FOR RAIL-BORNE TRANSPORTING CARTS WITHOUT SELF-DRIVING MEANS

[75] Inventors: Hubert Christ; Helmut Pfenning, both of Mainz, Fed. Rep. of Germany

[73] Assignee: Schott Glaswerke, Mainz, Fed. Rep. of Germany

[21] Appl. No.: 779,734

[22] Filed: Oct. 23, 1991

[30] Foreign Application Priority Data

Oct. 23, 1990 [DE] Fed. Rep. of Germany ....... 4033616

[51] Int. Cl.[5] .................... B65G 35/06; B65G 47/80
[52] U.S. Cl. .................... 104/163; 104/190; 198/465.3
[58] Field of Search ............... 104/190, 189, 168, 165, 104/163, 130, 99, 96, 35; 198/465.3, 795, 803.01, 803.02

[56] References Cited

U.S. PATENT DOCUMENTS

| | | | |
|---|---|---|---|
| 4,431,102 | 2/1984 | Bittner | 198/803.01 |
| 4,776,452 | 10/1988 | Burkhardt | 198/803.01 |
| 4,776,453 | 10/1988 | Miller | 198/465.3 |
| 4,934,515 | 6/1990 | Linden | 198/465.3 |
| 5,076,172 | 12/1991 | Grimm et al. | 104/166 |

FOREIGN PATENT DOCUMENTS

3804593C1 6/1989 Fed. Rep. of Germany .

*Primary Examiner*—Robert J. Oberleitner
*Assistant Examiner*—Kevin D. Rutherford
*Attorney, Agent, or Firm*—Millen, White, Zelano & Branigan

[57] ABSTRACT

A returning system for rail-borne transporting carts without self-driving means is provided with an auxiliary drive system which has an auxiliary drive wheel in the form of a friction wheel. The friction wheel clamps, for transporting a cart and cooperating with a contact pressure part with suitable parts of the transporting cart and transfers the latter from a transporting track to a return track located under the transporting track.

26 Claims, 2 Drawing Sheets

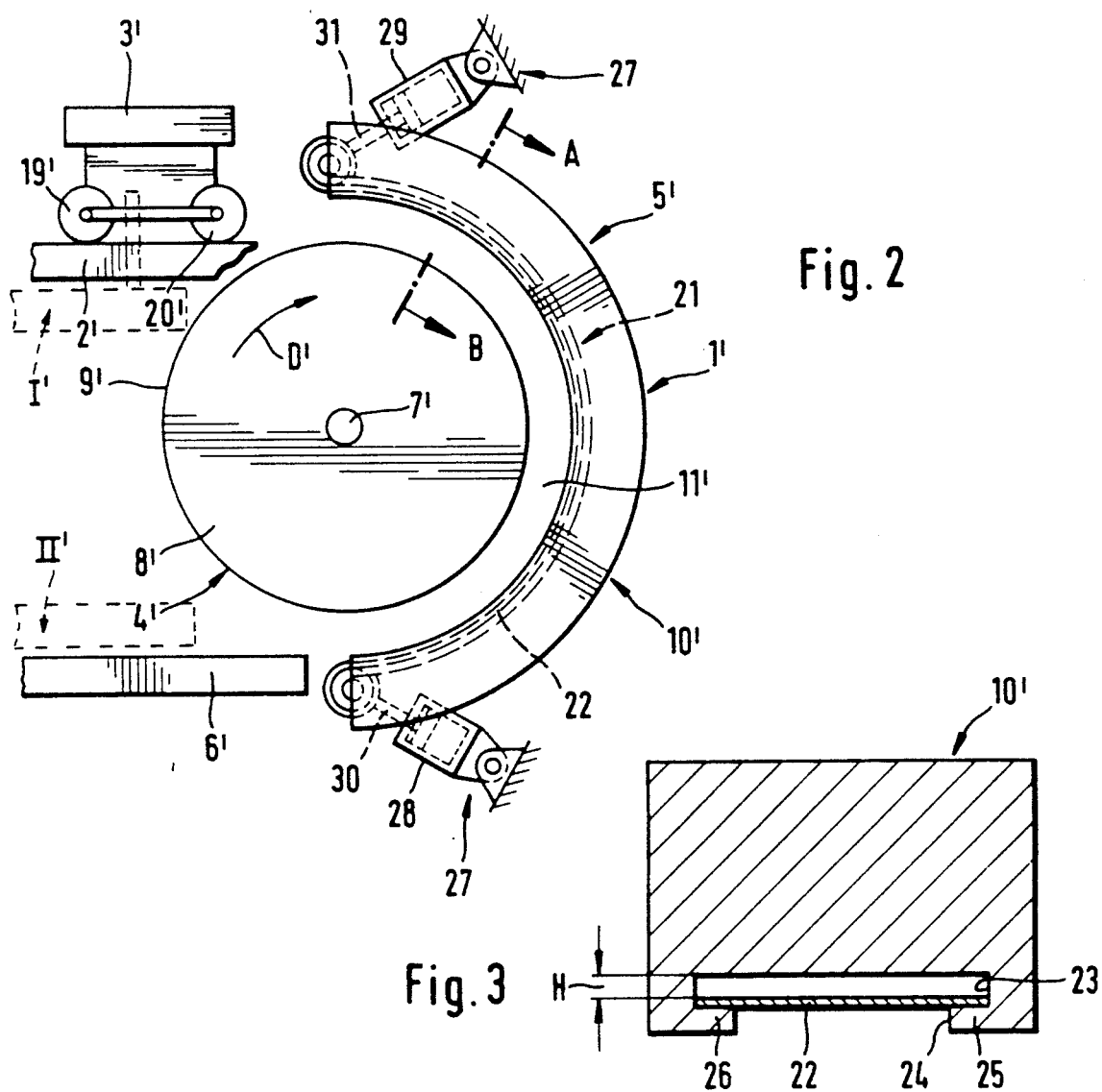

RETURNING SYSTEM FOR RAIL-BORNE TRANSPORTING CARTS WITHOUT SELF-DRIVING MEANS

BACKGROUND OF THE INVENTION

The invention relates to a returning system for transporting carts borne on running rails without self-driving means.

A returning system of this type is known from DE 38 04 593 C1. In this returning system, the transfer from one transporting track to another transporting track located under it is carried out positively. For this, the auxiliary drive wheel of the auxiliary drive system has a peripheral contour which, in the embodiment according to FIG. 1 of DE 38 04 593 C1 (see corresponding U.S. Pat. No. 5,076,172), has cutouts in which the running wheels of the transporting cart to be transferred engage.

SUMMARY OF THE INVENTION

An object of the present invention is to provide a returning system without self-driving means wherein the structural design is simplified.

Because the auxiliary drive wheel of the auxiliary drive system of the returning system according to the invention is constructed as a friction wheel, the result is a structural simplification of the auxiliary drive wheel, since the peripheral contour thereof is constructed with a smooth surface.

In the returning system according to the invention, transfer is, therefore, effected non-positively. Here the auxiliary drive wheel comes into engagement, in the manner of a sun wheel, with the engagement parts of the transporting cart. For example, the sun wheel has engagement parts in the form of its transporting rollers or separate friction rollers which engage on the transfer from the horizontal transporting track to the vertical curve. As a result of the rotation of the auxiliary drive wheel, the transporting cart is turned around in the vertical curve and is transferred to the lower transporting track.

In a particularly preferred embodiment of the returning system according to the invention, the driven auxiliary drive wheel or sun wheel can cooperate with a bow which is stationary and is provided with a contact pressure device for applying the necessary fraction forces.

In a particularly preferred embodiment which, from a structural standpoint, is very simple in design, said contact pressure device utilizes a tension belt. The tension belt is arranged in a guide channel of the bow and is housed therein. The guide channel is dimensioned such that the tension belt, on the one hand, is given a secure bearing surface and guidance but, on the other hand, a certain spring travel for the tension belt is formed which allows the pretension force to be adjusted according to a particular application. For this, the guide channel has a depth which is sufficient to determine the previously mentioned spring travel.

In order to apply the necessary forces, the tension belt cooperates with a tension device. In a particularly preferred embodiment, said tension device has at least two hydraulic or pneumatic cylinders which are connected to said tension belt at the ends of the tension belt at the start or finish of the vertical curve. By moving the piston rods of the cylinders in or out, the necessary pretension can be adjusted infinitely variably.

In an alternative embodiment, the bow is constructed from at least two spring-loaded segments articulatedly connected to one another. Here the spring-loaded segments, like the previously described stationary bow, are arranged concentric to the auxiliary drive wheel and, together therewith, delimit the vertical curve into which, for example, the friction rollers of the transporting cart are guided for the transfer thereof.

In the second embodiment, in which the bow is composed of spring-loaded segments, the spring-loaded segments are pretensioned in the direction of the auxiliary drive wheel, for example, by means of a plurality of springs.

In the third embodiment of the returning system according to the invention, the contact pressure part is constructed as a rigid, fixedly arranged bow which is arranged so that there is a defined spacing between the auxiliary drive wheel constructed as a friction wheel and the contact pressure bow or outer segment. In this embodiment, the transporting carriages have at least one, but preferably four, carrier devices which are mounted in the region of the transporting rollers. The carrier devices each have two buffers preferably made of rubber, and each has a counter-pressure roller which rolls against the outer segment. The rubber buffers are secured to a support or a rocker and are supported on the auxiliary drive wheel in the region of the vertical turn-round section. Pressure and, therefore, fractional engagement occur in this case between the rubber buffers and the auxiliary drive wheel. A transporting carriage, which is pushed by the main drive into the vertical turn-round section, is now carried non-positively as the auxiliary drive wheel rotates.

In this embodiment, the spacing between the auxiliary drive wheel and the outer segment is chosen such that a pressing and, therefore, frictional force corresponding to the necessary drive force are produced.

BRIEF DESCRIPTION OF THE DRAWINGS

Further details, features, and advantages of the present invention will be more fully appreciated as the same becomes better understood when considered in conjunction with the accompanying drawings in which like reference characters designate the same or similar parts throughout the several views, and wherein:

FIG. 1 is a side view showing a diagrammatically highly simplified illustration of a first embodiment of the returning system according to the invention;

FIG. 2 is a side view corresponding to FIG. 1 of a second embodiment of the invention;

FIG. 3 is a sectional view of the embodiment of FIG. 2 taken along line A-B of FIG. 2.

DETAILED DESCRIPTION

Figure 4:
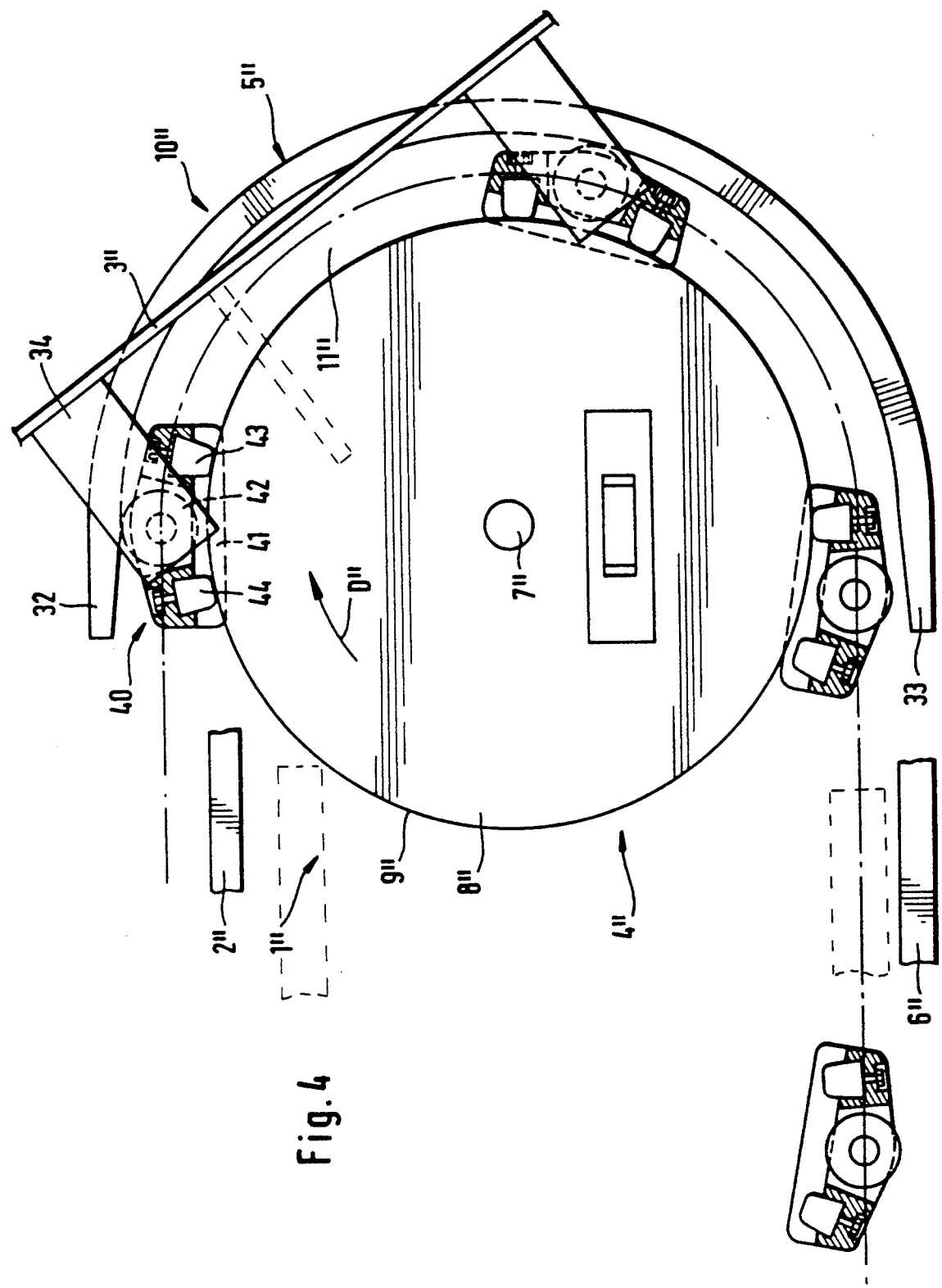
FIG. 4 is a side view corresponding to FIG. 1 of a third embodiment of the invention.

FIG. 1 illustrates a first embodiment of a returning system 1 according to the invention for transporting carriages 3 borne on running rails 2 without self-driving means by a first main drive system II. The transporting carriages are moved by a common main drive system (not illustrated in detail in FIG. 1) on the transporting track 2. An auxiliary drive system 4 is provided in the end region of the transporting track 2 such that the transporting carts 3 may be transferred in the upside down position by way of a vertical curve 5 onto a return track 6 located parallel under the transporting track 2 and provided with a second main drive system by a second main drive system II.

As FIG. 1 shows, the auxiliary drive system 4 has an auxiliary drive wheel 8 which is rotatable about a horizontal axis 7 of rotation and is drivable. The auxiliary drive wheel 8 is driven in the direction of the arrow D and takes hold of a transporting carriage 3, located in an end region of the upper transporting track 2, in order to transfer it along the vertical curve 5, which runs along a peripheral section of the auxiliary drive wheel 8 into the return track 6. With respect to the general construction of a returning system of this type, reference is hereby made to DE 38 04 593 C1, whereof the disclosure content thereof hereby becomes the disclosed portion of the present application.

The auxiliary drive wheel 8 of the returning system 1 according to the invention is constructed as a friction wheel. It, therefore, has a smooth peripheral contour 9 which, for example, can be provided with a suitable friction lining.

The auxiliary drive system 4 of the returning system 1 according to the invention has, in addition to the drive wheel 8, a contact pressure part which, in the embodiment illustrated in FIG. 1, is constructed as a bow 10, which is arranged at a certain spacing from the peripheral contour 9 of the friction wheel 9, concentrically thereto, as can be seen in detail from FIG. 1. By means of this, the vertical curve 5 or a guide path 11 is formed between the peripheral contour 9 and the semi-circular inner surface 12 of the bow 10.

In the embodiment illustrated in FIG. 1, the bow 10 is composed of two spring-loaded segments 13 and 14, which are connected to one another by way of a joint 15. However, the bow can also be a one-part rigid component.

At the start or finish of the vertical curve 5, the spring-loaded segments 14 and 13, respectively, are pretensioned in the direction of the auxiliary drive wheel 4 by a respective spring 16 and 17, respectively. A further spring is provided in the region of the joint 15 and also pretensions at this space the spring-loaded segments 13 and 14 in the direction of the auxiliary drive wheel.

It further emerges from the illustration of FIG. 1 that the transporting cart 3 with its transporting rollers 19 and 20 is clamped in between the auxiliary drive wheel 4 and the bow 10 in order to be transferred onto the lower transporting track or return track 6. Here the illustration of FIG. 1 shows a state in which the front transporting roller 20 is already taken hold of so that the transfer procedure can begin by rotating the auxiliary drive wheel 8 in the direction of the arrow D. In principle, it is also conceivable that instead of transporting rollers of the transporting cart 3, friction rollers mounted separately thereon can also be provided for transferring purposes.

FIGS. 2 and 3 illustrate a second embodiment of a returning system 1' according to the invention. All of the parts corresponding to the embodiment according to FIG. 1 are provided with like, but primed, reference numerals.

Unlike the embodiment according to FIG. 1, the bow 10' of the returning system 1' is constructed to be stationary.

The bow 10' is provided with a contact pressure device, marked with the reference numeral 21 in FIG. 2, which, according to the sectional illustration of FIG. 3, has a tension belt 22. The tension belt 22 runs in a semi-circle from the start of the vertical curve to the finish thereof, as can be seen in FIG. 2.

FIG. 3, again, illustrates that the tension belt 22 is arranged in a guide channel 23 of the bow 10' which is rectangular in cross-section. The guide channel 23 is arranged on the side of the bow 10' facing the auxiliary drive wheel 8'. The guide channel 23 has on a side facing the auxiliary drive wheel 8' an opening 24 so that belt-bearing surfaces 25 and 26 are formed which project from the edge region of the bow 10' to the opening 24, laterally delimiting said opening. FIG. 3 illustrates that the belt 22 bears on the belt-bearing surfaces 25 and 26. The guide channel 23 has a height H which determines the possible spring travel of the tension belt 22. The sectional illustration of FIG. 3 further shows that the width dimension of the guide channel 23 substantially corresponds to that of the tension belt 22.

FIG. 2, again, shows clearly that the tension belt 22 cooperates with a tension device 27 which, in this example, comprises two pneumatic or hydraulic cylinders 28 and 29 by way of their piston rods 30 and 31, respectively, to the free ends of the tension belt 22. Here, the connection points are located at the start or finish of the vertical curve, which can be seen directly from FIG. 2.

By means of this arrangement, the tension belt 22 can be tightened to a greater or lesser extent, depending on requirements, in order to be able to adjust the necessary friction forces for acting on the transporting or friction rollers of the transporting carts.

Both embodiments of the returning system 1 and 1', respectively, according to the invention are distinguished by a particularly simple construction, since the auxiliary drive wheels 8 and 8' can have a smooth outer surface, which considerably reduces production costs. Moreover, advantages are provided by the possibility of adjustment of the contact pressure or friction forces which are necessary to transfer the transporting carts 3 and 3'.

The third embodiment illustrated in FIG. 4 of the returning system 1" according to the invention is provided, with respect to all the parts which correspond to FIGS. 1 and 2, with like reference numerals, but would double-primed marks. 30 In the embodiment illustrated in FIG. 4 of the returning system 1" the contact pressure part 10" is constructed as a rigid, stationary bow. The bow 10" surrounds the auxiliary drive wheel 8" around half of its periphery and has at its ends slightly bevelled attachment parts 32 and 33 projecting beyond the half of its periphery, with the bevelled section in each case extending away from the outer periphery 9" of the drive wheel 8".

In a particularly preferred embodiment, each transporting cart 3" has four carrier devices 40 which are mounted in the region of the transporting rollers (not illustrated in FIG. 4). For this, the transporting cart 3" has securing bows, one of which is provided with the reference numeral 34 in FIG. 4. Since all the carrier devices of the transporting cart 3" are of identical construction, hereinafter reference is only made to the carrier device which is designated as a whole by the reference numeral 40 in FIG. 4.

The carrier device 40 has mounted on the securing bow 34 a support 41 which is constructed in the manner of a lip.

The support 41 rotatably houses a counter-pressure roller 42. On both sides of the counter-pressure roller 42 buffers 43 and 44 are mounted on the support 41. The buffers 43 and 44 are preferably made of rubber and are secured to the support 41 by way of two screw bolts. The longitudinal axes of the buffers 43 and 44 enclose an acute angle so that they can be supported by means of their free end faces on the peripheral contour 9" of the auxiliary drive wheel 8".

FIG. 4 illustrates that the spacing between the auxiliary drive wheel 8" and the inner surface of the bow 10", facing it, is chosen so that when the transporting cart 3" enters the vertical turn-round section, the buffers 43 and 44 press upon the auxiliary drive wheel 8", and the counter-pressure roller 42 comes into engagement with the inner surface of the bow 10". In order to transfer the transporting cart 3", pressing is developed between the buffers 43 and 44 and the auxiliary drive wheel 8" and the counter-pressure roller 42 rolls against the inner surface of the stationary bow 10", so that the transporting cart 3" is carried along non-positively.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

The entire disclosure of all applications, patents and publications, cited above and below, and of corresponding German application P 40 33 616.6-22, filed Oct. 23, 1990, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A returning system (1, 1', 1") for transporting carts (3, 3', 3") born on running rails without self-driving means, the transporting carts being moved by a first common main drive system (I, I", III") on a transporting track (2, 2', 2") an auxiliary drive system (4, 4', 4") for transferring the transporting carts (3, 3', 3") to an inverted position by moving the carts over a vertical curve (5, 5', 5") onto an end of a return track (6, 6', 6") located parallel to and under the transporting track, the return track being provided with a second common main drive system (II, II', III"); the auxiliary drive system (4, 4', 4") having an auxiliary drive wheel (8, 8', 8") with a friction surface in juxtaposition with the vertical curve (5, 5', 5") which is driven to be rotatable about a horizontal axis and a contact pressure part (10, 10', 10") arranged concentrically with the auxiliary drive wheel (8, 8', 8"), which contact pressure part (10, 10', 10") engages each of the transporting carts in turn and urges the transporting carts (3, 3', 3") into frictional engagement with the auxiliary drive wheel (8, 8', 8") resulting in a non-positive transfer of the transporting cart over the vertical curve (5, 4', 4").

2. The returning system of claim 1, wherein the contact pressure part is a semi-circular bow (10, 10").

3. The returning system of claim 2, wherein the bow (10) is comprised of at least two spring-loaded segments (13, 14) articulatedly connected to one another.

4. The returning system of claim 3, wherein the spring-loaded segments (13, 14) are pretensioned by a pretension device (16-18) acting in the direction of a contact pressure position on the auxiliary drive wheel (8).

5. The returning system of claim 4, wherein the pretension device preferably has three springs (16-18) which act at the start and finish of the vertical curve (5) and at a connection (15) of the spring-loaded segments (13, 14) to one another.

6. The returning system of claim 2, wherein the bow (10') is a stationary part which is provided with a contact pressure device (21).

7. The returning system of claim 6, wherein the contact pressure device (21) includes a tension belt (22) which is arranged in a guide channel (23) of the bow (10').

8. The returning system of claim 7, wherein the contact pressure device (21) further has a tension device (27) acting on the tension belt (22) for pretensioning thereof.

9. The returning system of claim 8, wherein the tension device (27) has two fluidic cylinders (28, 29) which are connected to opposite ends of the tension belt (22) at ends of the vertical curve (5').

10. The returning system of claim 8, wherein the tension device includes two springs which are connected to opposite ends of the tension belt (22) at the end of the vertical curve (5').

11. The returning system of claim 7, wherein the guide channel (23) is arranged on the side of the bow (10') facing the auxiliary drive wheel (8').

12. The returning system of claim 7, wherein the guide channel (23) is open on the side facing the auxiliary drive wheel (8').

13. The returning system of claim 7, wherein the guide channel (23) has two belt-bearing surfaces (25, 26) on both sides of its opening (24).

14. The returning system of claim 1, wherein a coupling means of the transporting cart (3, 3') engaging with the auxiliary drive wheel (8, 8') and the contact pressure part (10, 10') comprises four friction rollers mounted separately on the transporting cart (3, 3').

15. The returning system according to claim 14, wherein the coupling means of the transporting cart (3") engaging with the auxiliary drive wheel (8") and the contact pressure part (10") comprises at least one carrier device (40), which is arranged in the region of the friction rollers and which has a counter-pressure roller (42) bearing against the contact pressure part (10") and buffers (43, 44) supported on the auxiliary drive wheel (8").

16. The returning system of claim 15, wherein the contact pressure part (10") is constructed as a rigid, stationary bow.

17. The returning system of claim 16, wherein the bow (10") is arranged at a predetermined defined spacing from the auxiliary drive wheel (8").

18. The returning system of claim 15, wherein the counter-pressure roller (42) and the buffers (43, 44) are arranged on a support (41) of the transporting cart (3").

19. The returning system of claim 18, wherein the counter-pressure roller (42) is mounted rotatably on the support (41), and the buffers (43, 44) are arranged fixed on the support (41).

20. The returning system of claim 18, wherein the support (41) is constructed as a rocker.

21. The returning system of claim 15, wherein four carrier devices (40) are provided.

22. The returning system of claim 15, wherein the buffers (43, 44) are made of rubber.

23. The returning system of claim 1, wherein the part of the transporting cart (3, 3') engaging with the auxiliary drive wheel (8, 8') and the contact pressure part (10, 10") comprises transporting roller means (19, 20; 19', 20') thereon.

24. The returning system of claim 1, wherein in order to bring about the transfer procedure, there is provided a drive apparatus which rotates the auxiliary drive wheel (8, 8', 8'') continuously.

25. A system for returning transport carriages, the system comprising:

external driving means for driving the carriages only to transverse a first horizontal path in one direction and a second horizontal path, beneath the first path, in the opposite direction;

direction-reversing, vertically oriented, drivers at the beginning and end of each path, the vertically oriented drivers being independent from the external driving means:

driver-engaging means on each carriage for engaging the reversing drivers at the beginning and end of each path;

means for urging the driver-engaging means into engagement with the reversing drivers; and a wheel comprising each reversing driver, the wheels each having a circular peripheral surface for frictional engagement with the driver-engaging means when the means for urging the driver-engaging means urges the driver-engaging means into contact with the reversing drivers.

26. The system of claim 25, wherein the urging means are disposed proximate the periphery of each wheel beginning at the end of each path and end at the beginning of each path.

* * * * *